United States Patent
Scott, III et al.

(10) Patent No.: US 8,065,696 B2
(45) Date of Patent: Nov. 22, 2011

(54) CONTROL-BASED CONTENT PRICING

(75) Inventors: Samuel Thomas Scott, III, Los Gatos, CA (US); Kevin T. Carle, Mountain View, CA (US); Ann E. Chapman, Santa Cruz, CA (US)

(73) Assignee: Microsoft Corporation, Redmond, WA (US)

(*) Notice: Subject to any disclaimer, the term of this patent is extended or adjusted under 35 U.S.C. 154(b) by 1316 days.

(21) Appl. No.: 10/805,030

(22) Filed: Mar. 19, 2004

(65) Prior Publication Data

US 2005/0210498 A1    Sep. 22, 2005

(51) Int. Cl.
*H04N 7/16*      (2006.01)
*H04N 7/173*     (2006.01)

(52) U.S. Cl. .................. 725/8; 725/1; 725/88

(58) Field of Classification Search ............... 725/8, 23
See application file for complete search history.

(56) References Cited

U.S. PATENT DOCUMENTS

| | | | | |
|---|---|---|---|---|
| 5,532,735 A | * | 7/1996 | Blahut et al. .................. 725/32 |
| 5,654,747 A | | 8/1997 | Ottesen et al. |
| 6,035,281 A | | 3/2000 | Crosskey et al. |
| 6,157,377 A | * | 12/2000 | Shah-Nazaroff et al. ..... 715/719 |
| 6,219,788 B1 | | 4/2001 | Flavin et al. |
| 6,389,538 B1 | | 5/2002 | Gruse et al. |
| 6,400,996 B1 | * | 6/2002 | Hoffberg et al. ................ 700/83 |
| 6,972,680 B2 | * | 12/2005 | Yui et al. ...................... 340/540 |
| 7,340,759 B1 | * | 3/2008 | Rodriguez ........................ 725/8 |
| 2002/0052782 A1 | * | 5/2002 | Landesmann ................... 705/14 |
| 2002/0059584 A1 | * | 5/2002 | Ferman et al. .................. 725/34 |
| 2002/0129371 A1 | * | 9/2002 | Emura et al. ................... 725/61 |
| 2002/0144262 A1 | * | 10/2002 | Plotnick et al. ................ 725/32 |
| 2002/0162111 A1 | * | 10/2002 | Shimizu et al. ................ 725/87 |
| 2003/0149975 A1 | * | 8/2003 | Eldering et al. ................ 725/34 |
| 2003/0206632 A1 | * | 11/2003 | Itoh et al. ..................... 380/231 |
| 2004/0111756 A1 | * | 6/2004 | Stuckman et al. ............ 725/142 |

OTHER PUBLICATIONS

"Combining Pay-Per-View and Video-On-Demand Services" Paris et al., IEEE 1999, pp. 270-276.
"Broadcasting Video with the Knowledge of User Delay Preference", Chan et al., IEEE Transactions on Broadcasting, vol. 49, No. 2, Jun. 2003, pp. 150-161.
"Private and Fair Pay-Per-View Scheme for Web-Based Video-on-Demand Systems", Hankyu Joo, IEEE Transactions on Consumer Electronics, vol. 49, No. 2, May 2003, pp. 403-407.

* cited by examiner

*Primary Examiner* — Brian Pendleton
*Assistant Examiner* — Ryan Stronczer
(74) *Attorney, Agent, or Firm* — Lee & Hayes, PLLC

(57) ABSTRACT

In an implementation of control-based content pricing, a content server distributes media content to a client device in response to a request from the client device to receive the media content. A valuation application allocates a cost to the client device when the media content is distributed to the client device. The content server receives a view control input from the client device that indicates how the media content is to be rendered and the valuation application adjusts the cost according to the view control input and how the media content is to be rendered.

54 Claims, 4 Drawing Sheets

CONTROL-BASED CONTENT PRICING

TECHNICAL FIELD

This invention relates to media content distribution and, in particular, to control-based content pricing.

BACKGROUND

Television-based client devices, such as digital video recorders, are implemented by television viewers to receive video content in the form of video on-demand entertainment, such as movies, and to receive broadcast and/or interactive television entertainment and information. For example, a viewer can initiate receiving a movie for viewing from a video on-demand server system whenever it is convenient for the viewer to watch the movie. A digital video recorder includes a hard disk memory so that the viewer can also record the video content, and other media content of interest to the viewer, for future viewing when more convenient for the viewer.

Typically, media content providers of music, movies, and television control and authorize the distribution of the media content based on economic models that charge consumers a subscription fee to obtain authorized access to the media content, such as a monthly subscription fee or a one-time pay-per-view fee to receive a particular movie, sporting event, or other type of premium program for viewing. Further, typical subscription pricing, such as a monthly fee, is static from month to month and does not reflect the viewing choices and habits of individual viewers.

The advent of on-demand programming, such as video on-demand from a media content server system and recorded on-demand media content, provides a viewer with the option to navigate a program with media content navigation features commonly referred to as "trick modes". These navigation features are typically initiated by a viewer with a remote control device and include commands such as fast-forward, skip-ahead in the program, jump to a next segment, pause the program, rewind, and the like.

Fast-forward and skip-ahead navigation control inputs from a viewer, while beneficial when used to shorten the time for viewing a program, enables the viewer to skip past advertisements that may be prepended to a video on-demand movie, for example, or that may be interspersed between segments of a program, sporting event, or movie. In addition to the revenue obtained from viewers for monthly content subscriptions and pay-per-view purchases, these advertisements for products and services are a large source of revenue for a provider of the media content. However, advertisers will be increasingly unwilling to have their advertising messages communicated with media content that a viewer can navigate to skip over the advertisements.

Accordingly, media content providers need to provide alternate advertisement revenue models so that advertisers will continue to sponsor advertising messages being delivered with media content for consumer viewing.

SUMMARY

Control-based content pricing is described herein.

In an implementation, a content server distributes media content to a client device in response to a request from the client device to receive the media content. A valuation application allocates a cost to the client device when the media content is distributed to the client device. The content server receives a view control input from the client device that indicates how the media content is to be rendered and the valuation application adjusts the cost according to the view control input and how the media content is to be rendered.

In another implementation, a content server distributes media content with an associated advertisement to a client device in response to a request from the client device to receive the media content. A valuation application allocates a cost to the client device when the media content and the associated advertisement is distributed to the client device. The content server receives a content navigation input from the client device that indicates how the media content and the associated advertisement is to be rendered, and the valuation application adjusts the cost according to the content navigation input and whether the associated advertisement is rendered for viewing.

BRIEF DESCRIPTION OF THE DRAWINGS

The same numbers are used throughout the drawings to reference like features and components.

DETAILED DESCRIPTION

Control-based content pricing is described to provide a flexible advertisement revenue model that reflects user viewing choices and selections during playback of requested media, and enables targeted advertising and media content delivery, while maintaining consumer privacy. For example, the cost to order and receive media content, such as a on-demand movie, sporting event, or even music, may be reduced or negated by a user willing to watch and/or listen to an advertisement prior to or during a rendering of the media content. Further, control-based content pricing may apply to other non-video services, such as a stock ticker data feed that is distributed as media content via a client device.

Control-based content pricing allows for user-personalized pricing where price is a direct function of user viewing interaction. Further, the pricing may be expressed as a debit function, such as a debit to receive an on-demand movie, or as a credit function, such as a credit to watch an advertisement or infomercial before receiving the on-demand movie. The credit and/or debit functions of the pricing may also be based on view control inputs, such as content navigation inputs, received as user-input commands initiated with a remote control device.

The following discussion is directed to television-based entertainment and information systems, such as interactive television networks, cable networks, satellite networks, and Web-enabled television networks. Client devices in such systems range from full-resource clients with substantial memory and processing resources, such as television-enabled personal computers and television recorders equipped with hard-disks, to low-resource clients with limited memory and/or processing resources, such as traditional set-top boxes that are also implemented to record broadcast programs. While aspects of the described systems and methods for control-based content pricing can be implemented in any number of television-based entertainment and information systems, the systems and methods are described in the context of the following exemplary system architectures.

Figure 1:
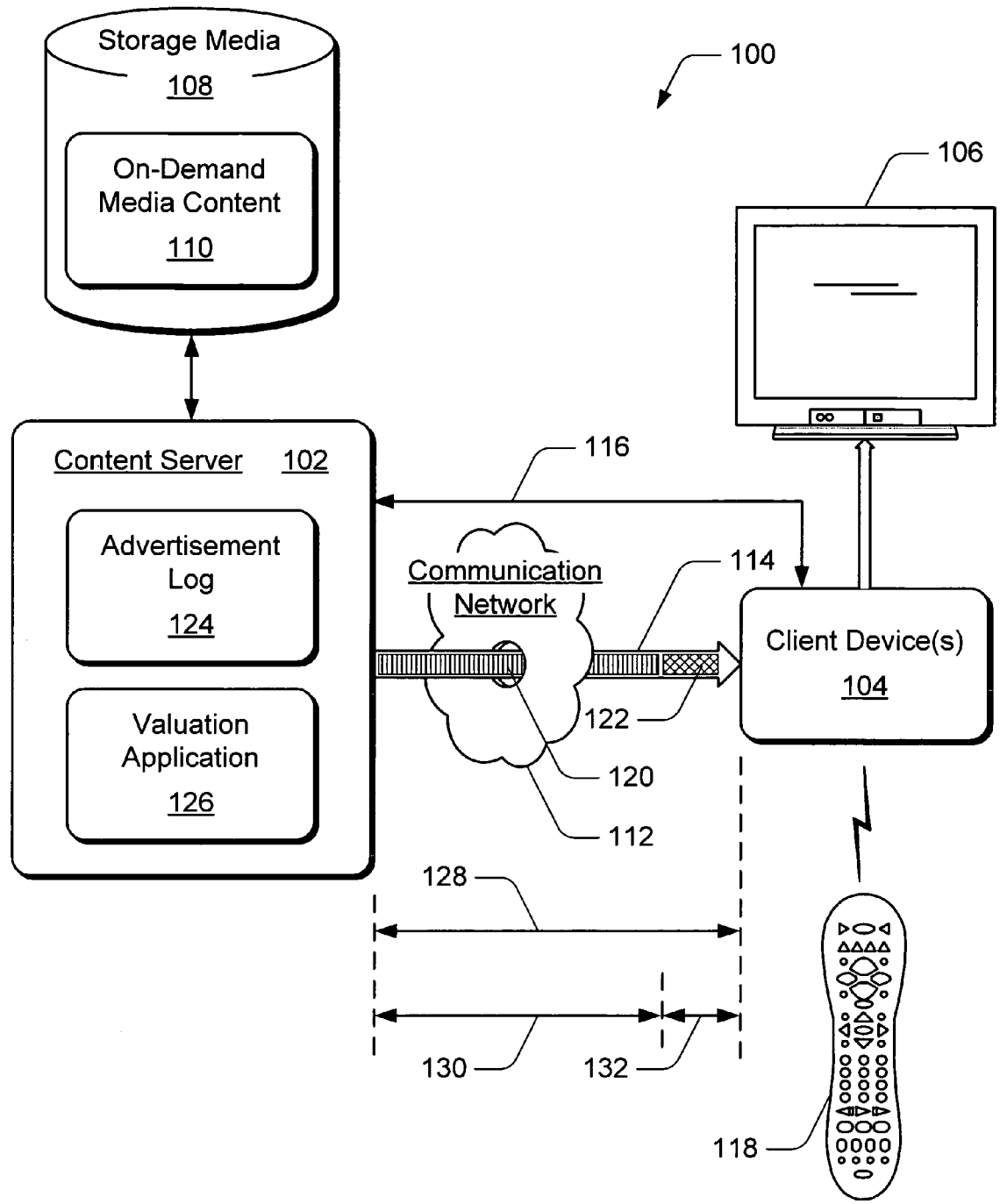
FIG. 1 illustrates various components of a media content distribution system in which an exemplary embodiment of control-based content pricing can be implemented.

FIG. 1 illustrates various components of a media content distribution system 100 in which an exemplary embodiment of control-based content pricing can be implemented. The system 100 includes a content server 102, one or more client devices 104, a display device 106, and a storage media 108. The content server 102 controls distribution of on-demand media content 110 which is maintained by the storage media 108. The on-demand media content can include on-demand movies, programs, music, advertisements, movie trailers, and any other type of audio, video, and/or image content. Although the content server 102 and the storage media 108 are illustrated and described as separate and/or remote components of the media content distribution system 100, the content server 102 may contain the storage media as an integrated memory component.

A client device 104 can be implemented in any number of embodiments, such as a set-top box, a digital video recorder (DVR) and playback system, and as any other type of client device that may be implemented in a television-based entertainment and information system. Further, client devices 104 may be implemented with any number and combination of differing components as described below with reference to FIG. 4. For example, in an embodiment of control-based content pricing, a client device 104 may include, or be directly connected to, a storage media for local-caching of media content 110 to first download the media content from content server 102 and then render the media content.

In the example shown in FIG. 1, a client device 104 receives the media content 110 from the content server 102 via a communication network 112 which can be implemented as any data communication medium, Internet protocol (IP) connection, or communication system having any protocol and/or messaging format. In an embodiment, the content server 102 communicates with a client device 104 via communication network 112 using simple object access protocol (SOAP) messages transported using hypertext transfer protocol (http), a protocol commonly used by the World Wide Web. In alternate embodiments, media content 110 is distributed from the content server 102 to the client device 104 as a media stream 114 via a cable network, radio frequency signal, over-air broadcast, satellite transmission, or via an IP connection utilizing any number of encodings such as .Net remoting, binary serialization, plain text, and the like.

Client device 104 also communicates with content server 102 via a communication control channel 116 which may also be implemented as any data communication medium or Internet protocol (IP) connection. Client device 104 receives view control input commands and other information from a user-operated input device, such as from remote control device 118. View control input commands include content navigation inputs such as fast-forward, skip-ahead in a program, jump to a next segment, pause the program, rewind, and the like.

A user can initiate a request to receive an on-demand movie, for example, with the remote control device 118. The client device 104 communicates the request for the movie to the content server via the communication control channel 116. The content server 102 receives the movie request and obtains the requested movie from the on-demand media content 110 maintained with storage media 108. The content server 102 then distributes the on-demand movie to the client device 104 via the communication network 112 as media content 120 of the media stream 114.

The content server 102 may also prepend an advertisement 122 to the media content 120 in the media stream 114, and distribute the advertisement 122 to the client device 104 along with the media content 120. Alternatively and/or in addition, the content server 102 can include one or more advertisements between segments of the media content 120 or after the media content 120 in the media stream 114. An advertisement included with media content 110, such as a requested on-demand movie, can be for any product or service and can be rendered as an image, video, audio and/or any combination thereof.

The client device 104 receives the media content 120 (e.g., the requested on-demand movie in this example) and the advertisement(s) 122, and initiates rendering the advertisement and media content on display device 106. A user can initiate a view control input with the remote control device 118, such as a content navigation input, to advance past or replay the advertisement or any portion of the movie. For example, to advance past the advertisement, the user can initiate a fast-forward, skip-ahead, or jump to a next segment command. To replay the advertisement or a portion of the movie, the user can initiate a replay or rewind command. Further, the user may initiate a pause or stop command to suspend or stop rendering the advertisement or movie. Any such view control input is communicated to the content server 102 from the client device 104 via the communication control channel 116.

The content server 102 receives a view control input from the client device 104 and processes the view control input accordingly in response to the command. For example, if a view control input is received as an advance command (e.g., to advance past the advertisement 122), the content server 102 stops distribution of media stream 114, and begins distribution of a second media stream that includes media content 120 without an advertisement. Alternatively, the content server 102 may distribute the media content 120 without an advertisement by way of an offset in the original media stream 114.

Client device 104 receives the second media stream (or a different offset of the original media stream 114) and can initiate rendering the media content on display device 106. In this example, the requested movie is displayed for viewing without an advertisement being shown first. In another example, a view control input may be received as a replay command (e.g., to replay a sports highlight), in which case the content server 102 again stops distribution of media stream 114, and begins distribution of a second media stream (or a different offset) that includes the replay portion of the media content.

In another embodiment, the content server 102 may distribute media content 120 to a first client device 104(1) via the media stream 114 over communication network 112, and then receive a view control input to pause distribution of the media content. The content server 102 can then receive a second view control input from a second client device 104(2) to resume distribution of the media content 120 from a point at which the media content was paused. Accordingly the content server distributes the media content 120 as a second media stream via communication network 112 to the second client device 104(2). For example, a viewer may have two or more client devices 104 located throughout a residence. The viewer can choose to pause an on-demand movie being rendered from a client device in one room of the residence and resume the on-demand movie in another room of the residence.

The different content navigation inputs, such as advance, replay, pause, and slow motion, initiate the content server 102 to stop distribution of a first media stream and begin distribution of a second media stream. Each content navigation input has an associated network cost and may result in an alternate media stream and/or additional bandwidth requirements to accommodate the many media stream distribution factors, such as speed, direction, size of the display (e.g., full-screen) and/or resolution. In an embodiment of control-based content pricing, the cost to order and receive media content may be reduced or negated if a user simply does not initiate any content navigation inputs while the media content is being rendered because of the reduced network cost that would otherwise be incurred to respond to the content navigation request or other user-command.

In another embodiment of control-based content pricing, the cost to order and receive media content, such as a on-demand movie, sporting event, or even music, may also be reduced or negated by a user willing to watch and/or listen to an advertisement prior to or during a rendering of the media content. When client device 104 receives a requested on-demand movie and initiates rending the movie on display device 106, the user can view the prepended advertisement 126 which reduces the cost that the user will be charged for ordering the on-demand movie. In one implementation, the user can passively accept the advertisement by simply allowing the advertisement to be rendered for viewing. In another implementation, the user can affirmatively accept to initiate a rendering of the advertisement 126 with the remote control device 118 such that a view control input is communicated from the client device 104 to the content server 102 via communication control channel 116.

The content server 102 includes an advertisement log 124 and a valuation application 126 that allocates a cost to the client device 104 when media content 120 is requested and distributed to the client device 104. Additionally, the valuation application 126 adjusts the cost according to received view control inputs and/or according to how the media content 120 and/or advertisement 122 is rendered. For example, if a user initiates a navigation control input to advance past (e.g., skip over) an advertisement, the cost of a requested on-demand movie may be increased. Similarly, if a user initiates a replay of a sporting event, the user may be charged for the replay control input and for each subsequent view control input. This provides an advertisement revenue model that reflects user viewing choices and selections during playback of requested on-demand media, and enables targeted advertising and media content delivery, while maintaining consumer privacy.

Although valuation application 126 is illustrated and described as a single application, the valuation application 126 can be implemented as several component applications distributed to each perform one or more functions in the media content distribution system 100. Further, valuation application 126 may be implemented on a device other than the content server 102, where the other device may also be configured for communication with content server 102 in a media content distribution system.

A duration of both the media content 120 and the advertisement 122 is represented by a base time-line 128. This represents the entire duration over which both the media content 120 and the advertisement 122 are rendered. The base time-line includes a first portion that is a media content duration 130 and a second portion that is an advertisement duration 132. If the duration over which the media content is rendered does not approximately equate to the base time-line duration 128, then, in one embodiment, the content server 102 can determine that the advertisement was skipped over (e.g., not rendered for viewing). For example, if the duration of a movie 130 is two hours and the advertisement duration 132 is ten minutes, then the base time-line is two hours and ten minutes. If media content is only rendered on display device 106 for two hours, then the advertisement was not rendered for viewing. Alternatively, the content server 102 can determine that an advertisement was skipped over when receiving a content navigation control corresponding to a user command to skip over or past an advertisement via the communication control channel 116.

In an embodiment, the valuation application 126 may adjust the cost proportionally to the segment of the media content that is rendered for viewing. For example, a viewer may dislike an on-demand movie and only watch half of it, or may only watch part of a sporting event in which a favorite team is losing, and then turn the program off. Accordingly, the valuation application 126 may decrease the cost to reflect the duration that the media content was rendered for viewing. In another embodiment, a viewer may be permitted to watch a portion of a requested program, such as the first one-third of a movie, prior to committing to pay for the movie. Accordingly, the valuation application 126 can adjust the cost, or not charge the viewer, if the viewer turns off the program and/or does not commit to continue receiving the program. Although media content distribution and rendering is described as having an associated cost allocated to a client device, any form of a credit, debit, value, point system, and/or combination thereof can be implemented in a control-based content pricing system.

The advertisement log 124 tracks and logs whether an advertisement (or advertisements) is rendered for viewing based on received content navigation inputs and/or based on the base time-line duration 128 that corresponds to rendering both the advertisement 122 and the media content 120. The advertisement log 124 is useful to illustrate advertising effectiveness in a control-based content pricing system, and to show current and prospective advertisers the types of advertisements that viewers are watching and during which programs.

Control-based content pricing can be implemented with any number of different markup languages, such as Extensible Markup Language (XML), or any other type of tag-based language. An XML schema definition (XSD) is included below to define the structure of one example XML implementation of control-based content pricing. In an embodiment, the XSD is implemented as a component of the valuation application 126 by the content server 102.

XSD Schema for control-based content pricing:

```
<?xml version="1.0" encoding="UTF-8"?>
<!--Schema for control-based content pricing-->
<xs:schema xmlns:xs="http://www.w3.org/2001/XMLSchema"
    elementFormDefault="qualified">
    <xs:complexType name="base_timelineType">
        <xs:sequence>
            <xs:element name="meter_start"
            type="meter_startType"/>
            <xs:element ref="meter_end"/>
        </xs:sequence>
    </xs:complexType>
    <xs:element name="dynamic_content">
    <xs:complexType>
        <xs:sequence>
            <xs:element name="base_timeline"
            type="base_timelineType"/>
            <xs:element name="fast_forward"
            type="fast_forwardType"
                maxOccurs="unbounded"/>
            <xs:element name="rewind" type="rewindType"
                maxOccurs="unbounded"/>
        </xs:sequence>
    </xs:complexType>
</xs:element>
<xs:complexType name="fast_forwardType">
```

-continued

```
    <xs:sequence>
        <xs:element name="meter_start" type="meter_startType"/>
        <xs:element ref="index_destination"/>
        <xs:element ref="use_count"/>
    </xs:sequence>
    <xs:attribute name="offset" type="xs:int" use="required"/>
    <xs:attribute name="window" type="xs:int"/>
    <xs:attribute name="units" type="xs:string"/>
</xs:complexType>
<xs:element name="index_destination" type="xs:string"/>
<xs:element name="meter_end">
    <xs:complexType/>
</xs:element>
<xs:complexType name="meter_startType">
        <xs:simpleContent>
            <xs:extension base="xs:string">
                <xs:attribute name="currencyUnit" type="xs:string"
                    use="required"/>
            </xs:extension>
        </xs:simpleContent>
</xs:complexType>
<xs:complexType name="rewindType">
        <xs:sequence>
            <xs:element name="meter_start"
                type="meter_startType"/>
            <xs:element ref="index_destination"/>
            <xs:element ref="use_count"/>
        </xs:sequence>
        <xs:attribute name="offset" type="xs:int" use="required"/>
        <xs:attribute name="window" type="xs:int" />
        <xs:attribute name="units" type="xs:string" />
</xs:complexType>
<xs:element name="use_count" type="xs:string"/>
</xs:schema>
```

Methods for control-based content pricing, such as exemplary methods 200 and 300 described with reference to FIGS. 2 and 3 respectively, may be described in the general context of computer executable instructions. Generally, computer executable instructions include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 2:
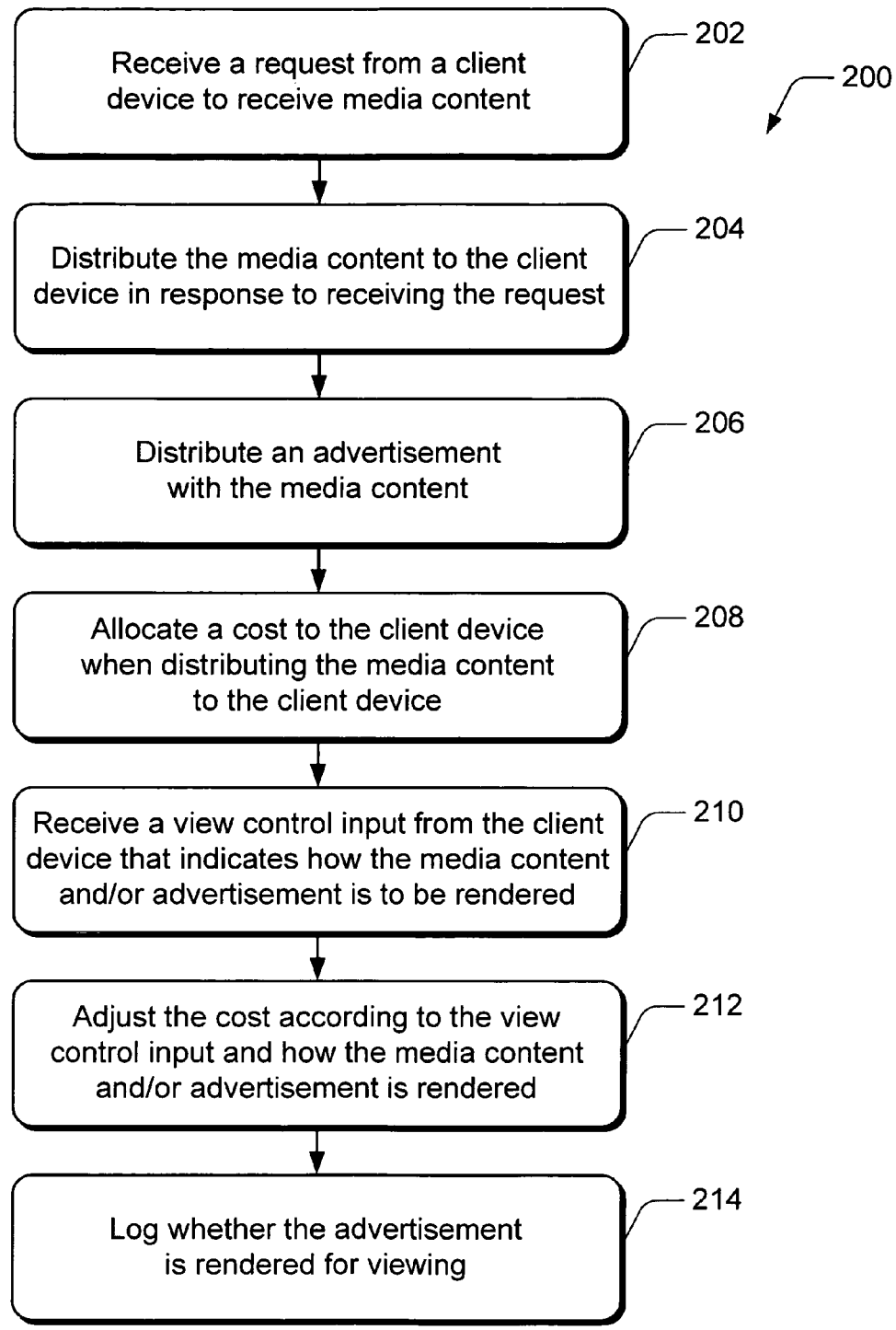
FIG. 2 is a flow diagram that illustrates an exemplary method for an embodiment of control-based content pricing.

FIG. 2 illustrates an exemplary method 200 for control-based content pricing. The order in which the method is described is not intended to be construed as a limitation, and any number of the described method blocks can be combined in any order to implement the method. Furthermore, the method can be implemented in any suitable hardware, software, firmware, or combination thereof.

At block 202, a request is received from a client device to receive media content. For example, a client device 104 requests media content 110, such as an on-demand movie that has been selected by a user via remote control device 118. The content server 102 receives the request for the media content 110 from client device 104 via the communication control channel 116.

At block 204, the media content is distributed to the client device in response to receiving the request. For example, content server 102 distributes media content 120 as a part of media stream 114 via the communication network 112 to the client device 104. At block 206, an advertisement is distributed with the media content. For example, the content server 102 prepends an advertisement 122 to the media content 120 in the media stream 114 and distributes the advertisement 122 to the client device 104 along with the media content 120.

At block 208, a cost is allocated to the client device when distributing the media content to the client device. For example, the valuation application 126 of the content server 102 allocates a cost for distributing the requested on-demand media content 110 to the client device 104, and associates the cost with the client device.

At block 210, a view control input is received from the client device that indicates how the media content and/or advertisement is to be rendered. For example, the client device 104 communicates a view control input, such as a content navigation control, to the content server 102 via the communication control channel 116. The client device can receive a view control input as a user input command selected by the user via remote control device 118. A content navigation input can be received to advance past an advertisement, to advance the media content, to end the distribution of the media content to a client device, and to replay a portion of the media content being rendered.

At block 212, the cost is adjusted according to the view control input and how the media content and/or advertisement is rendered. For example, the valuation application 126 can decrease the cost according to a decrease in bandwidth to distribute a reduced resolution media content to the client device. Further, the valuation application 126 can decrease the cost based on the advertisement being rendered for viewing, and in response to the distribution end of the media content, such as when a viewer turns a program off. The valuation application 126 can increase the cost based on the advertisement not being rendered for viewing, in response to a command to advance the media content, in response to a command to replay a portion of the media content, and in response to a command to pause the media content.

At block 214, whether or not an advertisement is rendered for viewing is logged. For example, advertisement log 124 tracks and logs whether an advertisement is rendered for viewing based on received content navigation inputs and/or based on rendering both the advertisement and the media content.

Figure 3:
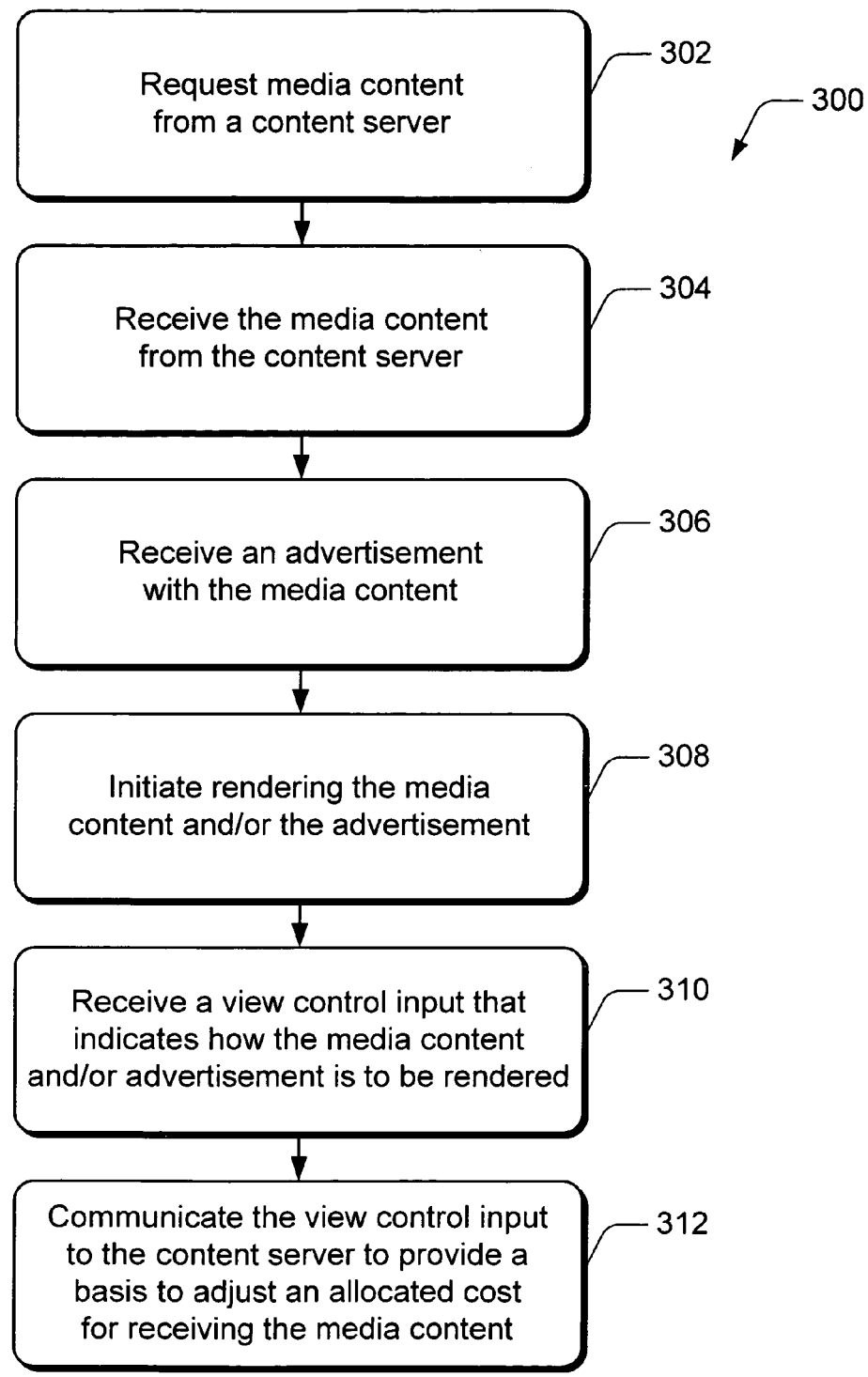
FIG. 3 is a flow diagram that illustrates an exemplary method for an embodiment of control-based content pricing.

FIG. 3 illustrates an exemplary method 300 for control-based content pricing. The order in which the method is described is not intended to be construed as a limitation, and any number of the described method blocks can be combined in any order to implement the method. Furthermore, the method can be implemented in any suitable hardware, software, firmware, or combination thereof.

At block 302, media content is requested from a content server. For example, a client device 104 requests media content 110, such as an on-demand movie that has been selected by a user via remote control device 118. At block 304, the media content is received from the content server. For example, client device 104 receives media content 120 from content server 102 as a part of media stream 114 via the communication network 112.

At block 306, an advertisement is received with the media content. For example, client device 104 receives advertisement 122 from content server 102 as part of media stream 114 via the communication network 112. At block 308, a rendering of the media content is initiated. For example, client device 104 initiates that the received media content be rendered for viewing on display device 106.

At block 310, a view control input is received that indicates how the media content is to be rendered. For example, the client device 104 can receive a view control input as a user input command selected by the user via remote control device 118. Further, the view control input can include a command to advance past the advertisement such that the advertisement is not rendered for viewing, a command to render the advertisement for viewing, a command to replay a portion of the media content being rendered, and a command to advance the media content being rendered.

At block 312, the view control input is communicated to the content server to provide a basis to adjust an allocated cost for receiving the media content. For example, the client device 104 communicates the view control input to the content server 102 via the communication control channel 116. The cost allocated to the client device 104 can be adjusted by the valuation application 126 based on whether the advertisement is rendered for viewing. Further, the view control input can be communicated to the content server as a command to advance past the advertisement to provide a basis to increase the allocated cost, as a command to render the advertisement to provide a basis to decrease the allocated cost, as a replay command to provide a basis to increase the allocated cost, and as an advance command to provide a basis to increase the allocated cost.

Figure 4:
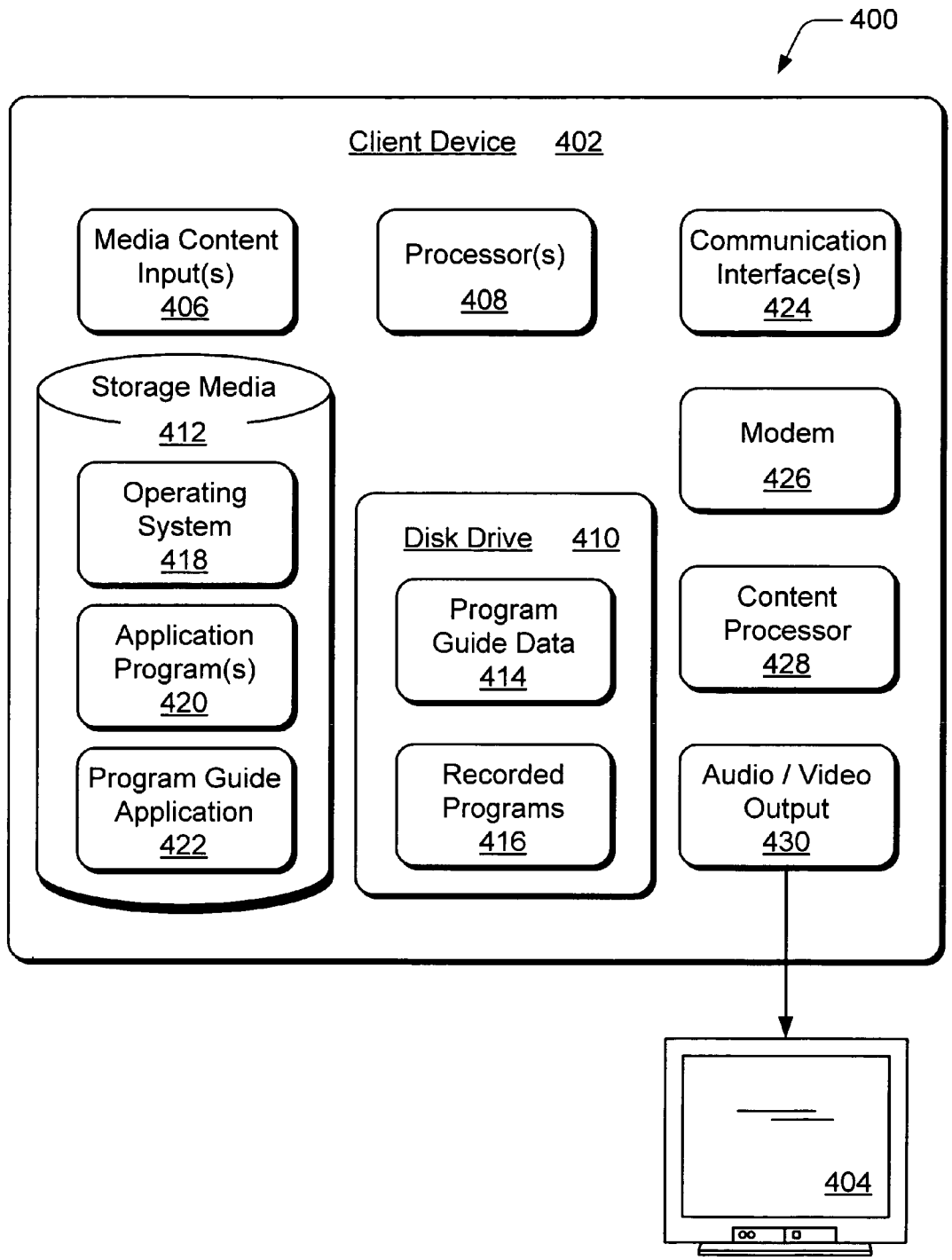
FIG. 4 illustrates various components of an exemplary client device implemented in a television-based system.

FIG. 4 illustrates a television-based system 400 that includes an exemplary client device 402 and a display device 404 on which the media content and advertisements of control-based content pricing are rendered for display. Client device 402 can be implemented as a set-top box, a satellite receiver, a TV recorder with a hard disk, a digital video recorder (DVR) and playback system, a game console, an information appliance, and as any number of similar embodiments.

Client device 402 includes one or more media content inputs 406 which may include tuners that can be tuned to various frequencies or channels to receive television signals, and/or which may include Internet Protocol (IP) inputs over which streams of media content are received via an IP-based network. Client device 402 also includes one or more processors 408 (e.g., any of microprocessors, controllers, and the like) which process various instructions to control the operation of client device 402 and to communicate with other electronic and computing devices.

Client device 402 can be implemented with a disk drive 410 and a storage media 412, examples of which include a random access memory (RAM) and a non-volatile memory. Disk drive 410 can include any type of storage device, such as a hard disk drive, a recordable and/or rewriteable compact disc (CD), a DVD, a DVD+RW, and the like. The memory components provide data storage mechanisms to store various information and/or data such as received media content, program guide data 414, and recorded programs 416.

An operating system 418, application program(s) 420, and a program guide application 422 can be maintained with storage media 412 and executed on processor(s) 408. The program guide application 422 is implemented to process the program guide data 414 and generate program guides for display which enable a viewer to navigate through an onscreen display and locate broadcast programs, recorded programs, video on-demand programs and movies, interactive game selections, and other media access information or content of interest to the viewer.

Client device 402 further includes communication interface(s) 424 and a modem 426. The communication interface (s) 424 can be implemented as any one or more of a serial and/or parallel interface, a wireless interface, any type of network interface, and as any other type of communication interface. Modem 426 facilitates client device 402 communication with other electronic and computing devices via a conventional telephone line, a DSL connection, cable, and/or other type of connection.

Client device 402 also includes a content processor 428 which can include a video decoder and/or additional processors to receive, process, and decode media content and program data. Client device 402 also includes an audio and/or video output 430 that provides the audio and video to display device 404, or to other devices that process and/or display, or otherwise render, the audio and video data. Video signals and audio signals can be communicated from client device 402 to television 404 via an RF (radio frequency) link, S-video link, composite video link, component video link, analog audio connection, or other similar communication links.

Although embodiments of control-based content pricing have been described in language specific to structural features and/or methods, it is to be understood that the subject of the appended claims is not necessarily limited to the specific features or methods described. Rather, the specific features and methods are disclosed as exemplary implementations of control-based content pricing.

The invention claimed is:

1. A control-based content pricing system, comprising:
   a content server configured to:
      distribute a media content to a client device in response to a request from the client device to receive the media content;
      distribute an advertisement with the media content by prepending the advertisement to the media content before the media content and the advertisement are distributed to the client device;
      receive a view control input from the client device after the media content and the advertisement have been distributed to the client device, the view control input indicating how the media content and the advertisement are to be rendered, wherein the view control input comprises a navigation control selected from a plurality of navigation controls;
   an advertisement log located on the content server and configured to track if the advertisement is rendered for viewing by the client device based on the view control input received or a base time-line based on rendering both the media content and the advertisement on the client device; and
   a valuation application located on the content server and configured to:
      allocate a cost to the client device for the media content that is distributed, wherein the cost is a direct function of a user viewing interaction based on a view control input received during a playback of the media content requested;
      adjust the cost allocated for the media content according to the view control input and how the media content was rendered on the client device, wherein each navigation control of the plurality of navigation controls has an associated cost adjustment; and
      adjust the cost based on whether the advertisement was rendered for viewing, the cost being adjusted based on the view control input and a base time-line, the base time-line including a media content duration and an advertisement duration.

2. A control-based content pricing system as recited in claim 1, wherein:
   the media content has a first value associated with a particular property of the media content;
   the content server is further configured to receive the view control input as a command to select a second value for the particular property of the media content being rendered; and the valuation application is further configured to decrease the cost according to a decrease in distribution cost of the media content having the second value for the particular property compared to the media content having the first value for the particular property.

3. A control-based content pricing system as recited in claim 1, wherein the content server is further configured to receive the view control input as a command to render both the advertisement and the media content for viewing, and wherein the valuation application is further configured to decrease the cost in response to the view control input to render both the advertisement and the media content for viewing.

4. A control-based content pricing system as recited in claim 1, wherein the content server is further configured to distribute the media content as a first media stream and, in response to the view control input, distribute the media content as a second media stream to render the media content according the view control input, and wherein the valuation application is further configured to adjust the cost based on the second media stream.

5. A control-based content pricing system as recited in claim 1, wherein the content server is further configured to receive the view control input as a command to end distribution of the media content to the client device, and wherein the valuation application is further configured to decrease the cost in response to a distribution end of the media content.

6. A control-based content pricing system as recited in claim 1, wherein the content server is further configured to receive the view control input as a command to replay a portion of the media content being rendered, and wherein the valuation application is further configured to increase the cost in response to the replay command.

7. A control-based content pricing system as recited in claim 1, wherein the content server is further configured to receive the view control input as a command to advance the media content being rendered, and wherein the valuation application is further configured to increase the cost in response to the advance command.

8. A control-based content pricing system as recited in claim 1, wherein the content server is further configured to:
distribute the media content as a first media stream;
receive the view control input as a command to replay a portion of the media content being rendered; and
distribute the media content as a second media stream to render the media content according the view control input;
wherein the valuation application is further configured to increase the cost based on the second media stream.

9. A control-based content pricing system as recited in claim 1, wherein the content server is further configured to:
distribute the media content as a first media stream; receive the view control input as a command to advance the media content being rendered; and
distribute the media content as a second media stream to render the media content according the view control input;
wherein the valuation application is further configured to increase the cost based on the second media stream.

10. A control-based content pricing system as recited in claim 1, wherein the content server is further configured to:
receive the view control input as a command to render the advertisement for viewing; and
log that the advertisement was rendered for viewing.

11. A control-based content pricing system as recited in claim 1, wherein the content server is further configured to:
distribute the media content as a first media stream;
receive the view control input as a command to pause distribution of the media content to the client device;
receive a second view control input from a second client device to resume distribution of the media content from a point at which the media content was paused; and
distribute the media content as a second media stream to the second client device, wherein the valuation application is further configured to increase the cost based on the second media stream.

12. A digital video content server, comprising:
a valuation application configured to allocate a cost to a client device for distribution of a video content to the client device from the digital video content server, wherein an advertisement is prepended to the video content before the video content and the advertisement are distributed to the client device;
the valuation application further configured to adjust the cost allocated for the video content based on whether or not the advertisement is rendered for viewing by the client device, wherein adjustment of the cost is based on a user viewing interaction that is indicated by a user-selected view control input, and adjustment of the cost is based on a base time-line, the base time-line including a media content duration and an advertisement duration.

13. A digital video content server as recited in claim 12, the valuation application further configured to increase the cost in response to a view control input received from the client device to advance past the advertisement such that the advertisement is not rendered for viewing.

14. A digital video content server as recited in claim 12, the valuation application further configured to decrease the cost in response to a view control input received from the client device to render the advertisement for viewing.

15. A digital video content server as recited in claim 12, the valuation application further configured to decrease the cost in response to a view control input received from the client device to render both the advertisement and the video content for viewing.

16. A control-based content pricing system, comprising:
a client device configured to:
request media content from a content server;
receive the media content with an advertisement from the content server, wherein the advertisement is prepended to the media content at the content server;
initiate rendering the media content;
receive a view control input that indicates how the media content is to be rendered, wherein the view control input comprises a navigation control selected from a plurality of navigation controls; and
communicate the view control input to the content server via a communication control channel, the view control input providing a basis to adjust a cost allocated to the client device for the media content based upon a cost adjustment associated with the selected navigation control, wherein each navigation control of the plurality of navigation controls is associated with a particular cost adjustment, wherein the cost allocated to the client device is adjusted based on whether the advertisement is rendered for viewing, the cost being adjusted based on the control view input and a base time-line, the base time-line including a media content duration and an advertisement duration.

17. A control-based content pricing system as recited in claim 16, wherein the client device is further configured to:
receive the view control input as a first command to select a first property of the media content being rendered and to receive the view control input as a second command to select a second property of the media content being rendered, and wherein the valuation application is further configured to decrease the cost according to a decrease in distribution cost of the media content having the first property content compared to the media content having the second property.

18. A control-based content pricing system as recited in claim 16, wherein the cost allocated to the client device is adjusted to zero if the advertisement is rendered for viewing.

19. A control-based content pricing system as recited in claim 16, wherein the cost allocated to the client device is increased if the view control input is a command to advance past the advertisement such that the advertisement is not rendered for viewing.

20. A control-based content pricing system as recited in claim 16, wherein the cost allocated to the client device is decreased if the view control input is a command to render the advertisement for viewing.

21. A control-based content pricing system as recited in claim 16, wherein the client device is further configured to receive the view control input as a command to replay a portion of the media content being rendered, and wherein the cost allocated to the client device is increased in response to the replay command.

22. A control-based content pricing system as recited in claim 16, wherein the client device is further configured to receive the view control input as a command to advance the media content being rendered, and wherein the cost allocated to the client device is increased in response to the advance command.

23. A television-based system comprising the control-based content pricing system as recited in claim 16, wherein the client device is a television-based receiver configured to receive the media content as digital video.

24. A computing system comprising the control-based content pricing system as recited in claim 16, wherein the client device is a television-enabled computing device configured to receive the media content as digital video.

25. A method using computer instructions stored on a computer-readable medium and executable by a processor, the method comprising:
  receiving a request from a client device to receive media content;
  distributing the media content to the client device in response to receiving the request, wherein an advertisement is prepended to the media content before the media content and the advertisement are distributed to the client device;
  receiving a view control input selected from a plurality of view control inputs;
  allocating a cost for the media content that is distributed to the client device when distributing the media content to the client device;
  adjusting the cost based on whether the advertisement is rendered for viewing, the cost being adjusted based on the view control input and a base time-line that includes a media content duration and an advertisement duration.

26. A method as recited in claim 25, further comprising distributing a reduced resolution media content to the client device in response to receiving the view control input as a first command to select a first property of the media content being rendered and to receive the view control input as a second command to select a second property of the media content being rendered, and wherein the valuation application is further configured to decrease the cost according to a decrease in distribution cost of the media content having the first property compared to the media content having the second property.

27. A method as recited in claim 25, wherein receiving the view control input includes receiving a content navigation input to advance past the advertisement, and adjusting the cost includes increasing the cost based on the advertisement not being rendered for viewing.

28. A method as recited in claim 25, wherein adjusting the cost includes decreasing the cost based on the advertisement being rendered for viewing.

29. A method as recited in claim 25, wherein receiving the view control input includes receiving a command to end distribution of the media content to the client device, and wherein adjusting the cost includes decreasing the cost in response to the distribution end of the media content.

30. A method as recited in claim 25, wherein receiving the view control input includes receiving a command to advance the media content, and wherein adjusting the cost includes increasing the cost in response to the command to advance the media content.

31. A method as recited in claim 25, wherein:
  distributing the media content includes distributing a first media stream to the client device;
  receiving the view control input includes receiving a command to advance the media content;
  adjusting the cost includes increasing the cost in response to the command to advance the media content; and
  the method further comprises distributing a second media stream to the client device to render the media content based on the view control input.

32. A method as recited in claim 25, wherein receiving the view control input includes receiving a command to replay a portion of the media content being rendered, and wherein adjusting the cost includes increasing the cost in response to the command to replay the portion of the media content.

33. A method as recited in claim 25, wherein:
  distributing the media content includes distributing a first media stream to the client device;
  receiving the view control input includes receiving a command to replay a portion of the media content being rendered;
  adjusting the cost includes increasing the cost in response to the command to replay the portion of the media content; and
  the method further comprises distributing a second media stream to the client device to render the media content based on the view control input.

34. A method as recited in claim 25, further comprising logging whether the advertisement is rendered for viewing based on the view control input.

35. A method as recited in claim 25, further comprising logging whether the advertisement is rendered for viewing based on the base time-line.

36. A method as recited in claim 25, wherein:
  distributing the media content includes distributing a first media stream to the client device;
  receiving the view control input includes receiving a command to pause distribution of the media content to the client device;
  adjusting the cost includes increasing the cost in response to the command to pause the media content; and
  the method further comprises:
    receiving a second view control input from a second client device to resume distribution of the media content from a point at which the media content was paused; and distributing the media content as a second media stream to the second client device.

37. A method using computer instructions stored on a computer-readable medium and executable by a processor, the method comprising:
   requesting media content on a client device from a content server;
   receiving on the client device the media content with an advertisement from the content server, wherein the advertisement is prepended to the media content at the content server;
   initiating rendering the media content on the client device;
   receiving on the client device, a user-selected view control input selected from a plurality of view control inputs, wherein each view control input of the plurality of view control inputs has an associated cost adjustment such that a first view control input of the plurality of view control inputs has an associated first cost adjustment and a second view control input of the plurality of view control inputs has an associated second cost adjustment, the first cost adjustment being different from the second cost adjustment; and
   communicating the user-selected view control input from the client device to the content server to provide a basis to adjust an allocated cost for the client device for receiving the media content, wherein the basis for adjusting the allocated cost is based upon the cost adjustment associated with the user-selected view control input.

38. A method as recited in claim 37, wherein:
   receiving the user-selected view control input includes receiving a command to advance past the advertisement such that the advertisement is not rendered for viewing; and
   communicating the user-selected view control input includes communicating the command to advance past the advertisement to provide a basis to increase the allocated cost.

39. A method as recited in claim 37, wherein:
   receiving the user-selected view control input includes receiving a command to render the advertisement for viewing; and
   communicating the user-selected view control input includes communicating the command to render the advertisement to provide a basis to decrease the allocated cost.

40. A method as recited in claim 37, wherein receiving the user-selected view control input includes receiving a command to replay a portion of the media content being rendered, and wherein communicating the user-selected view control input includes communicating the replay command to provide a basis to increase the allocated cost.

41. A method as recited in claim 37, wherein receiving the user-selected view control input includes receiving a command to advance the media content being rendered, and communicating the user-selected view control input includes communicating the advance command to provide a basis to increase the allocated cost.

42. One or more memory storage devices storing computer executable instructions that, when executed, direct a media content server to:
   distribute media content to a client device in response to a request from the client device to receive the media content, wherein an advertisement is prepended to the media content before the media content and the advertisement are distributed to the client device;
   receive a view control input from the client device that indicates how the media content is to be rendered;
   allocate a cost for the media content that is distributed to the client device when the media content is distributed to the client device, and
   adjust the cost according to whether or not the advertisement was rendered for viewing, wherein adjusting the cost is based on the view control input and a base time-line, the base time-line including a media content duration and an advertisement duration.

43. One or more computer-readable storage media as recited in claim 42, further storing computer executable instructions that, when executed, direct the media content server to increase the cost in response to a view control input to advance the media content.

44. One or more computer-readable storage media as recited in claim 42, further storing computer executable instructions that, when executed, direct the media content server to increase the cost in response to a view control input to replay a portion of the media content.

45. A control-based content pricing system as recited in claim 1, wherein the plurality of navigation controls comprises:
   a fast-forward command;
   a skip ahead command;
   a jump to command;
   a pause command;
   a replay command; and
   a slow command.

46. A control-based content pricing system as recited in claim 1, wherein:
   a first navigation control of the plurality of navigation controls has an associated first cost adjustment;
   a second navigation control of the plurality of navigation controls has an associated second cost adjustment, the second cost adjustment being different from the first cost adjustment; and
   the valuation application is configured to adjust the cost allocated for the media content according to the view control input and how the media content was rendered on the client device such that:
      if the view control input comprises the first navigation control, the first cost adjustment is used to adjust the cost allocated for the media content; and
      if the view control input comprises the second navigation control, the second cost adjustment is used to adjust the cost allocated for the media content.

47. A control-based content pricing system as recited in claim 2, wherein the particular property includes a display resolution.

48. A method as recited in claim 25, wherein:
   a first view control input of the plurality of view control inputs has an associated first cost adjustment;
   a second view control input of the plurality of view control inputs has an associated second cost adjustment; and
   the first cost adjustment is different from the second cost adjustment.

49. A method as recited in claim 37, wherein:
   the first cost adjustment results in an increase in the allocated cost; and
   the second cost adjustment results in a decrease in the allocated cost.

50. A method as recited in claim 37, wherein:
   the first cost adjustment results in an increase in the allocated cost; and
   the second cost adjustment results in a decrease in the allocated cost.

51. A method comprising:
   receiving from a client device, a request for media content;

determining a cost to be charged for delivering the media content;

delivering the media content to the client device, the media content that is delivered including a prepended advertisement;

determining a base time-line that includes a duration associated with the media content and a duration associated with the advertisement;

maintaining a first cost adjustment in association with a first view control and a second cost adjustment in association with a second view control, the first cost adjustment being different from the second cost adjustment;

receiving from the client device, an indication of a user-selected view control to be applied to the media content; and adjusting the cost to be charged for delivering the media content, the cost being adjusted based on a comparison between a duration over which the media content as it was rendered through the client device and the base time-line and the cost being adjusted based on a cost adjustment associated with the user-selected view control, such that if the user-selected view control is the first view control, the cost is adjusted based on the first cost adjustment and if the user-selected view control is a the second view control, the cost is adjusted based on the second cost adjustment.

52. A method as recited in claim 51, wherein the comparison between the duration over which the media content as it was rendered through the client device and the base time-line results in the cost being increased.

53. A method as recited in claim 51, wherein the comparison between the duration over which the media content as it was rendered through the client device and the base time-line results in the cost being decreased.

54. A method as recited in claim 51, wherein the first cost adjustment is a cost increase and the second cost adjustment is a cost decrease.

* * * * *